United States Patent [19]

Sorathia et al.

[11] Patent Number: 5,320,870
[45] Date of Patent: Jun. 14, 1994

[54] FIRE PROTECTIVE COATING AND METHOD FOR APPLYING SAME TO A STRUCTURE

[75] Inventors: Usman A. Sorathia, Arnold; Timothy L. Dapp, Bowie, both of Md.

[73] Assignee: The United States of America as represented by the Secretary of the Navy, Washington, D.C.

[21] Appl. No.: 752,249

[22] Filed: Aug. 28, 1991

[51] Int. Cl.$^5$ .............................................. B05D 3/02
[52] U.S. Cl. ............................ 427/385.5; 427/393.3; 427/393.5; 427/426
[58] Field of Search ............... 427/426, 385.5, 393.5, 427/393.3, 202

[56] References Cited

U.S. PATENT DOCUMENTS

| | | | |
|---|---|---|---|
| 4,014,838 | 3/1977 | Kraft et al. | 427/408 |
| 4,221,697 | 9/1980 | Osborn et al. | 427/385.5 |
| 4,264,671 | 4/1981 | Gillern et al. | 427/389.8 |
| 4,536,446 | 8/1985 | Hsu et al. | 427/389.7 |
| 4,536,447 | 8/1985 | Hsu | 427/389.7 |
| 4,543,366 | 9/1985 | Smith | 427/421 |
| 4,916,210 | 4/1990 | Jackson | 427/385.5 |
| 5,020,189 | 4/1993 | Shea | 427/385.5 |

Primary Examiner—Janyce Bell
Attorney, Agent, or Firm—Gary G. Borda

[57] ABSTRACT

A fire protective coating and method for applying same to a composite structure are provided. The coating is a composition of matter comprising a phenolic resin and strength reinforcing fibers embedded within the phenolic resin. The method of coating the structure with the composition of matter uses a phenolic resin in the liquid state. In this way, a mixture of the phenolic resin and strength reinforcing fibers can be applied to the structure's surface by conventional spraying techniques. As the mixture on the surface cures, a fire protective coating is formed on the structure's surface.

4 Claims, No Drawings

FIRE PROTECTIVE COATING AND METHOD FOR APPLYING SAME TO A STRUCTURE

The invention described herein may be manufactured and used by or for the Government of the United States of America for governmental purposes without payment of any royalties thereon or therefor.

FIELD OF THE INVENTION

The invention relates generally to fire protection and more particularly to a fire protective coating and method for applying same to a composite structure.

BACKGROUND OF THE INVENTION

Use of composite materials as structural components for the marine and aerospace industries dates back to the 1940's. Typically, the composite materials are polyester or epoxy resin based. While choice of a particular composite is dictated by application, generally any one of the composites is the optimal choice with respect to strength, weight, cost, etc., when compared with other materials (e.g., metal, wood, etc.).

Unfortunately, experience has shown that most organic matrix materials, particularly the conventional polyester and epoxy types, support combustion and generate large quantities of smoke when burning. It has thus become necessary to place restrictions on using such materials in certain applications until such time that these materials can offer improved fire performance. Towards this end, it has been proposed that phenolic laminates be used as a sacrificial fire barrier formed on the individual, composite material structure components. Phenolic laminates, when compared with the polyester and epoxy resins, exhibit higher ignition resistance, low flammability and generate far lesser amounts of smoke. Phenolic laminates, however, possess poor bonding properties due to their higher void content. Since the laminates are made from continuous roving, debonding causes large portions of laminate ply to peel and, subsequently, fall off. Thus, the phenolic laminates frequently break up and fall off the structural component to which they have been bonded. Furthermore, since the phenolic laminates are formed on each individual structural component, fire protection discontinuities are formed between assembled components. Finally, high labor cost is associated with the laminated components since the laminates are typically hand laid.

SUMMARY OF THE INVENTION

Accordingly, it is an object of the present invention to provide for improved fire performance from composite material structures.

It is a further object of the present invention to provide a fire protection material and method of applying same to a composite material structure.

Another object of the present invention is to provide a fire protection material for a composite material structure that does not break up and fall off the composite material structure during fire exposure.

Yet another object of the present invention is to provide a fire protection material and method for applying same that affords improved fire protection for a completed assembly built from composite material components.

Still another object of the present invention is to provide a cost effective solution to the problem of fire protection for a composite material structure.

Other objects and advantages of the present invention will become more obvious hereinafter in the specification and drawings.

In accordance with the present invention, a sprayable coating is applied to a surface of a structure and is cured to form an improved fire protective coating for the structure. The coating is a composition of matter comprising a phenolic resin and strength reinforcing, chopped fibers mixed with the phenolic resin. The method of coating the structure uses a low viscosity phenolic resin in the liquid state. In this way, a mixture of the phenolic resin and strength reinforcing fibers can be applied to the structure's surface by conventional spraying techniques. As the mixture cures on the surface, a layer of fire protective material is formed on the structure's surface.

DETAILED DESCRIPTION OF THE INVENTION

In order to provide a fire protective coating for a structure built of composite (or any other) materials, the coating must achieve the desired fire performance standards and maintain its structural integrity when exposed to fire. The description to follow discloses such a fire protective coating and a method for applying same to a structure made of, for example, composite materials.

In general, the present invention uses a phenolic resin as the base material for the fire protective coating. The phenolic resin is chosen for its well-known fire performance characteristics. To increase the strength of the phenolic resin and improve the mechanical strength of the char formed during fire exposure, chopped fibers are embedded within the phenolic resin. The chopped fibers are typically made from glass or carbon and may vary in size (i.e., "milled" or powdered fibers, $\frac{1}{8}$" long, $\frac{1}{4}$" long, etc., up to approximately 2" in length). The milled fibers are especially useful for absorbing excess phenolic resin moisture while the longer fibers make the resulting coating less brittle. Accordingly, many applications may require a mixture of various size chopped fibers. In all cases, however, the addition of chopped fibers of any size aids in the prevention of coating break up during fire exposure.

More specifically, the phenolic resin used by the present invention should be a low viscosity liquid at room temperature (i.e., less than approximately 3000 centipoise at room temperature) for reasons that will become more apparent hereinafter. While the choice of a specific phenolic resin is based on specific fire design criteria, there exist several commercially available phenolic resins that are low viscosity liquids at room temperature. These include, but are not limited to, the "Mark V" phenolic system manufactured by ATS Products, Inc., "L1000 PRF2" manufactured by Indspec, Inc. and "J2018L" manufactured by BP Chemicals.

The phenolic resin and chopped fibers are applied to the surface of a structure in one of several ways. In the preferred embodiment, the phenolic resin and chopped fibers are simultaneously, but from separate nozzles, sprayed onto the surface of the structure to be protected. (A phenolic resin typically must be mixed with a curing catalyst. Thus, the catalyst is sprayed from a separate nozzle. The chopped fibers are typically sprayed from a separate fiber chopping gun.) Since the phenolic resin is chosen to be liquid at room temperature, conventional spraying equipment may be used to apply the phenolic resin. The choice of a phenolic resin exhibiting a low viscosity facilitates the spraying operation and prevents the clogging of spray nozzles. Similarly, the chopped fibers may be sprayed onto the surface of the structure by conventional means. The fibers are thus held in place within the liquid phenolic resin coating. In this way, the phenolic resin, and chopped fibers mixed therein for strength reinforcement, cure to form a fire protective coating.

In an alternative embodiment, the chopped fibers and phenolic system are mixed together prior to being sprayed onto the structure's surface. However, pre-mixing of the larger chopped fibers may increase the viscosity of the resin/fiber mixture to the point where clogging problems may develop for the spraying equipment. Thus, the pre-mixing approach is best suited for applications requiring the use of milled or powdered fibers. Such uses include the application of the fire protective coating in corners or in places where spray nozzle access is limited. In these instances, it may also be necessary to hand trowel the coating in order to achieve complete surface coverage.

In order to provide a more clear understanding of the advantages of the instant invention, two (composite structure) panel constructions were subjected to ignitability tests as set forth by specific test standards of the American Society for Testing and Materials (ASTM). The specific test is known as the "Heat Release and Ignitability Test", the specifications of which are set out in detail in ASTM E-1354. Briefly, ignitability is defined as the ease with which a material ignites. The lower the applied radiant heat flux, the longer the time before ignition. Thus, for each radiant heat flux, a longer time to ignition is desirable.

The two panels subjected to the ignitability testing procedures were constructed as follows:

1) Panel A was constructed of a glass epoxy composite material and served as the control. For testing purposes, Panel A was fabricated from 7701/7781 glass epoxy prepreg manufactured by the Imperial Chemical Industry Company. Panel A was autoclave cured at 250° F. and was 0.25 inches thick. Of course, it is to be understood that the choice of composite material is not a limitation on the present invention and that any composite material could be used.

2) Panel B was fabricated by spraying a low viscosity liquid phenolic resin mixed with chopped glass fibers onto a glass epoxy composite substrate (i.e., Panel A for the instant example). For testing purposes, the phenolic resin was a phenol formaldehyde based liquid whose viscosity at room temperature was less than 1000 centipoise. Since phenolic resins require a catalyst for curing, one of either an acid or base catalyst must be mixed with the phenolic resin. In either case, the choice of catalyst is not a constraint on the inventive aspects of the present invention. In general, the catalyst should allow the user sufficient time to effectively spray the resin/catalyst mixture before curing begins (e.g., 10-20 minutes as required by the specific application). While the exact amount of catalyst used will vary by application, a typical catalyst-to-resin composition utilizes 5-10 parts catalyst to 100 parts resin. For the instant example, an acid catalyst comprising xylene sulfonic acid and phosphoric acid was chosen. One such acid catalyst is "Phencat-15" manufactured by BP Chemicals. This phenolic resin/catalyst mixture, along with one inch long glass fibers, was sprayed onto the glass epoxy composite substrate to a thickness of approximately 0.05 inches. Panel B was then cured at room temperature and post cured at 140°-160° F. for 2-3 hours. It is to be understood that the step of post curing at a high temperature was done merely for efficiency of testing. Alternatively, curing could take place at room temperature for 24 hours or more. Of course, in field applications or in the case of large assembled composite structures, this is often the only practical and/or cost effective method of curing.

Both panel constructions were subjected to the test conditions set forth in ASTM-1354. Furthermore, to satisfy Naval applications requirements, both configurations were tested at four different radiant fluxes, namely, 25, 50, 75 and 100 kW/m². For each radiant heat flux, several panels were tested. Accordingly, the "Times to Ignition" in TABLE 1 below are averages.

TABLE 1

| Radiant Heat Flux | Times to Ignition (in seconds) | | | |
| --- | --- | --- | --- | --- |
| | 25 kW/m² | 50 kW/m² | 75 kW/m² | 100 kW/m² |
| Panel A | 156 s | 43.3 s | 22.6 s | 13.8 s |
| Panel B | 420 s | 139 s | 79.2 s | 42.9 s |

It is easily seen that the fire protection afforded by the sprayed phenolic coating having fibers mixed therein (Panel B) was far superior to the non-coated control (Panel A).

The advantages of the present invention are numerous. By mixing chopped glass or carbon fibers in a phenolic resin, a strong, fire protective coating has been developed for composite (or other) structures. Furthermore, by selecting a phenolic resin that is a low viscosity liquid at room temperature, the phenolic resin may be easily applied to an assembled structure by conventional spraying means. In this way, all joints, crevices, holes, etc. on newly assembled structures can be coated with fire protective material thereby eliminating any discontinuities in the fire protective coating. In addition, the present invention will find great utility in field applications, especially since no additional heat is required to cure the fire protective coating. The cost associated with the implementation of the present invention is far lower than the hand laid laminate coatings. Finally, characteristics of the fire protective coating are easily adjusted by mixing appropriately sized fibers with the phenolic resin. The mixing can take place at the time of application (spraying) or prior to application.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. A method of coating an organic matrix composite material structure with a fire protective coating material to improve the fire performance of the organic matrix composite material structure, comprising the steps of:

providing a phenolic resin, a curing analyst, and a plurality of strength reinforcing fibers, wherein at room temperature said phenolic resin is a liquid having a viscosity of less than approximately 3000 centipoise, and further wherein said strength reinforcing fibers are milled fibers, chopped fibers having lengths of two inches or less, or a combination thereof;

applying a mixture of said phenolic resin, said curing analyst, and said strength reinforcing fibers to a surface of the organic matrix composite material structure, said applying being carried out at room temperature;

wherein said step of applying comprises the step of simultaneously spraying said phenolic resin, said curing catalyst, and said strength reinforcing fibers onto the surface of the organic matrix composite material structure, said phenolic resin being sprayed from a first spray nozzle, said curing catalyst being sprayed from a second spray nozzle, and said strength reinforcing fibers being sprayed from a third spray nozzle, whereby said mixture is formed on the surface of the structure; and curing said mixture at room temperature to form a fire protective coating thereon, whereby the strength reinforcing fibers are embedded within the cured phenolic resin wherein upon exposure to fire the structural integrity of said cured phenolic resin is maintained such that said cured phenolic resin does not break up and fall off the surface of the composite material structure.

2. A method according to claim 1 wherein said phenolic resin comprises phenol formaldehyde having a viscosity at room temperature of less than approximately 1000 centipoise, said strength reinforcing fibers comprise approximately one inch long glass fibers, and said curing catalyst comprises xylene sulfonic acid and phosphoric acid, wherein during said providing step between approximately 5 to 10 parts curing catalyst per 100 parts phenolic resin are provided, and further wherein during said step of applying said mixture is applied to a thickness of approximately 0.05 inches.

3. A method of coating an organic matrix composite material structure with a fire protective coating material to improve the fire performance of the organic matrix composite material structure, comprising the steps of:

providing a phenolic resin, a curing analyst, and a plurality of strength reinforcing fibers, wherein at room temperature said phenolic resin is a liquid having a viscosity of less than approximately 3000 centipoise, and further wherein said strength reinforcing fibers are milled fibers;

applying a mixture of said phenolic resin, said curing analyst, and said strength reinforcing fibers to a surface of the organic matrix composite material structure, said applying being carried out at room temperature;

wherein said step of applying includes the steps of forming said mixture and spraying said formed mixture onto the surface of the composite material structure; and curing said mixture at room temperature to form a fire protective coating thereon, whereby the strength reinforcing fibers are embedded within the cured phenolic resin wherein upon exposure to fire the structural integrity of said cured phenolic resin is maintained such that said cured phenolic resin does not break up and fall off the surface of the organic matrix composite material structure.

4. A method according to claim 3 wherein said phenolic resin comprises phenol formaldehyde having a viscosity at room temperature of less than approximately 1000 centipoise, said curing catalyst comprises xylene sulfonic acid and phosphoric acid, wherein during said providing step between approximately 5 to 10 parts curing catalyst per 100 parts phenolic resin are provided, and further wherein during said step of applying said mixture is applied to a thickness of approximately 0.05 inches.

* * * * *